(12) United States Patent
Dove

(10) Patent No.: US 8,692,683 B2
(45) Date of Patent: Apr. 8, 2014

(54) ILLUMINABLE INDICATOR OF ELECTRONIC DEVICE BEING ENABLED BASED AT LEAST ON USER PRESENCE

(75) Inventor: Daniel J. Dove, Colfax, CA (US)

(73) Assignee: Hewlett-Packard Development Company, L.P.

( * ) Notice: Subject to any disclaimer, the term of this patent is extended or adjusted under 35 U.S.C. 154(b) by 245 days.

(21) Appl. No.: 13/258,548

(22) PCT Filed: Aug. 9, 2009

(86) PCT No.: PCT/US2009/053242
§ 371 (c)(1),
(2), (4) Date: Sep. 22, 2011

(87) PCT Pub. No.: WO2011/019333
PCT Pub. Date: Feb. 17, 2011

(65) Prior Publication Data
US 2012/0013476 A1    Jan. 19, 2012

(51) Int. Cl.
*G08B 21/00* (2006.01)

(52) U.S. Cl.
USPC ........................................ 340/686.6

(58) Field of Classification Search
USPC ............ 340/686.6, 524, 527, 691.6; 315/129; 713/320
See application file for complete search history.

(56) References Cited

U.S. PATENT DOCUMENTS

| | | | |
|---|---|---|---|
| 5,371,489 A * | 12/1994 | Carroll et al. | 340/565 |
| 5,742,238 A | 4/1998 | Fox | |
| 6,138,241 A * | 10/2000 | Eckel et al. | 713/300 |
| 6,356,038 B2 * | 3/2002 | Bishel | 315/291 |
| 6,359,564 B1 * | 3/2002 | Thacker | 340/573.1 |
| 7,436,132 B1 * | 10/2008 | Null | 315/312 |
| 8,228,184 B2 * | 7/2012 | Blakeley et al. | 340/539.1 |
| 2006/0038506 A1 | 2/2006 | Rose et al. | |
| 2006/0261741 A1 * | 11/2006 | Hwang | 315/56 |
| 2006/0279896 A1 | 12/2006 | Bruwer | |
| 2007/0146126 A1 | 6/2007 | Wang | |
| 2010/0164736 A1 | 7/2010 | Byers et al. | |

FOREIGN PATENT DOCUMENTS

| | | |
|---|---|---|
| CN | 1977238 A | 6/2007 |
| EP | 0608552 | 8/1994 |
| EP | 1672460 | 6/2006 |

OTHER PUBLICATIONS

IPRP, corresponding application PCT/US2009/053242, Feb. 23, 2012.
ISR and WO, PCT/US2009/053242, May 10, 2010.
Extended EP SR, corresponding EP application No. 09848321.7, Jan. 8, 2013.

(Continued)

*Primary Examiner* — Phung Nguyen

(57) ABSTRACT

An electronic device includes an illuminable indicator, a presence detector, and a controller. The illuminable indicator is to indicate information to a user of the electronic device by one or more of being illuminated and not being illuminated. The presence detector is to detect presence of the user in proximity to the electronic device regardless of whether the user is moving or is stationary. Absence of the user is inferred upon the presence detector not detecting the presence of the user. The controller is to enable the illuminable indicator based at least on the presence of the user as detected by the presence detector and to disable the illuminable indictor based at least on the absence of the user. Enablement of the illuminable indicator does not mean that the illuminable indicator is necessarily illuminated. Disablement of the illuminable indicator means that the illuminable indicator is never illuminated while disabled.

15 Claims, 4 Drawing Sheets

(56) References Cited

OTHER PUBLICATIONS

English translation (machine-generated) of Abstract from Chinese Patent Publication No. CN1977238A [retrieved on Nov. 27, 2013], Retrieved from the Internet: <http://worldwide.espacenet.com/publicationDetails/biblio?CC=CN&NR=1977238A&KC=A&FT=D&ND=3&date=20070606&DB=worldwide.espacenet.com&locale=en_EP>.

* cited by examiner

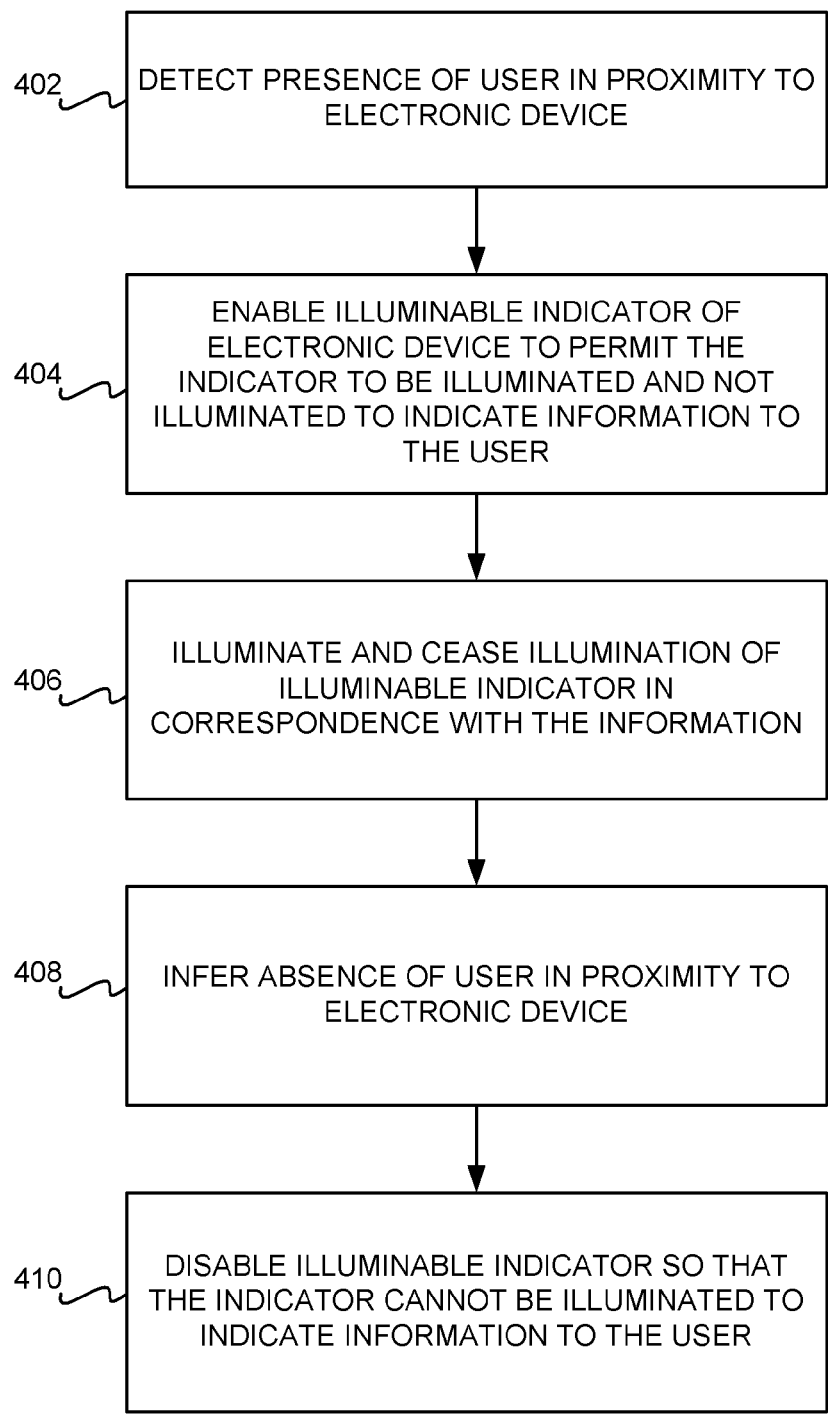

ILLUMINABLE INDICATOR OF ELECTRONIC DEVICE BEING ENABLED BASED AT LEAST ON USER PRESENCE

BACKGROUND

Electronic devices commonly include illuminable indicators to indicate information to a user by being illuminated or by not being illuminated. For example, networking equipment like switches, routers, and hubs commonly include at least one light-emitting diode (LED) for each network port. When a network cable that is connected to network ports of two pieces of networking equipment, such that a networking link is established between the equipment, the LED's at the network ports are illuminated to indicate to the user that the link has been established. LED's are also used to indicate network activity by flashing at a rate corresponding the level of network activity. LED's may further be used to indicate a mode of operation or the speed of a networking link.

BRIEF DESCRIPTION OF THE DRAWINGS

FIG. 4 is a flowchart of a method, according to an embodiment of the present disclosure.

DETAILED DESCRIPTION

Figure 1:
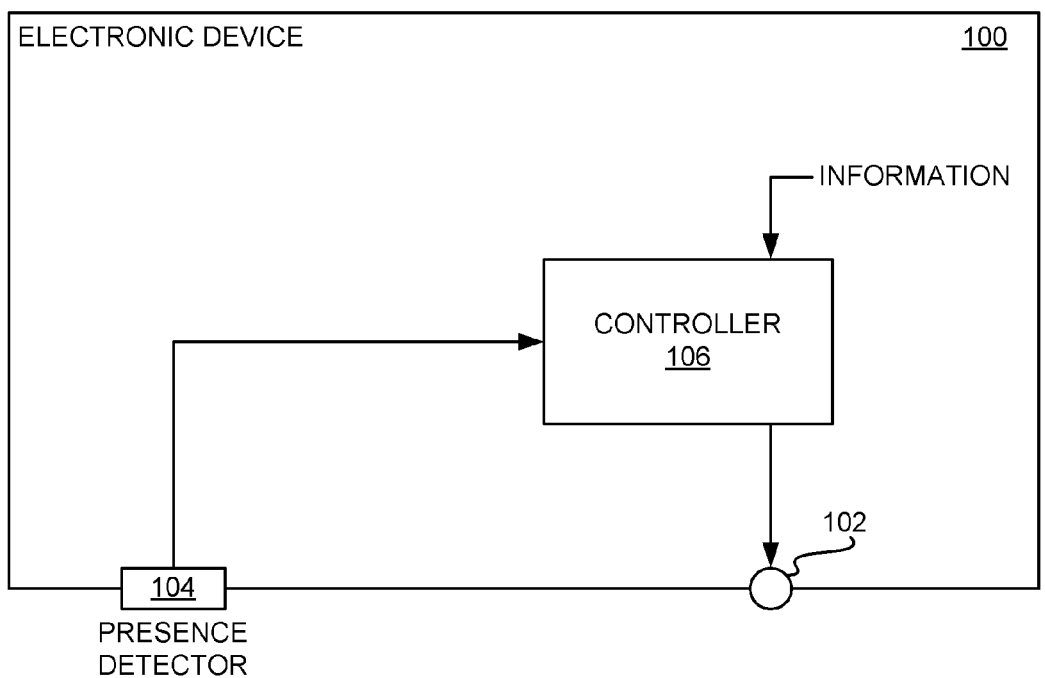
FIG. 1 is a diagram of an electronic device having an illuminable indicator controlled by detection of presence of a user in proximity to the electronic device, according to an embodiment of the present disclosure.

As noted in the background, electronic devices commonly include illuminable indicators to indicate information to a user by being illuminated or by not being illuminated. However, the illuminable indicators are illuminated regardless of whether there is any user present to actually view the indicators. Conventional wisdom is that this is not a problem, since many types of illuminable indicators, such as light-emitting diodes (LED's), use very little power for there to be a concern that power is being wasted. A typical LED, for instance, may consume less than fifty milliwatts.

However, some types of electronic devices include a large number of illuminable indicators, and some types of operating environments may have a large number of such electronic devices. For example, a networking switch having two LED's per network port and having 48 ports can consume about six watts of power just to illuminate all the LED's, when typical power supply efficiencies are taken into account. A wiring closet or room containing twenty networking switches can thus mean that up to 120 watts of power may be wasted when no one is observing the switches. This problem is exacerbated due to the fact that the networking switches are typically operational twenty-four hours a day, seven days a week.

It is believed that the inventor has discovered this problem, and has developed a solution so that electronic devices do not waste power illuminating illuminable indicators when no user is present to view them. If the presence of a user in proximity to an electronic device is detected, then the illuminable indicators of the device are enabled. By comparison, if the presence of the user in proximity to the electronic device is not detected, then the illuminable indicators of the device are not enabled. In this way, power is not wasted to illuminate illuminable indicators of an electronic device when no one is present to observe them.

Two points are particularly made in this respect. First, enablement of an illuminable indicator does not mean that the indicator is necessarily illuminated, whereas disablement of an illuminable indicator means that the indicator is never illuminated while disabled. That is, even if the presence of a user in proximity to an electronic device is detected such that the illuminable indicators of the device are enabled, the indicators may nevertheless not be illuminated. This is because the illuminable indicators are still illuminated just in correspondence with the information that they are to indicate to the user.

For example, a networking switch may have an illuminable indicator for a network port to indicate whether a cable has been plugged into the port such that a networking link has been established between the port of the switch and another piece of networking equipment. Even if the illuminable indicator is enabled, if a cable has not been plugged into the network port, or a networking link has not been established with another piece of networking equipment, the illuminable indicator is not illuminated. Likewise, if the illuminable indicator is disabled, even if a cable has been plugged into the network port such that a networking link has been established with another piece of networking equipment, the illuminable indicator is not illuminated.

Second, the presence of a user in proximity to an electronic device is detected regardless of whether the user is moving or is stationary. In this sense, presence detection is in contradistinction to conventional motion detection, which detects that a user is present and is in motion, and does not detect that a user is present but is stationary. For example, if a user is present but is stationary and not in motion, a motion detector does not detect the user, whereas a presence detector does. Furthermore, absence of a user in proximity to the electronic device is inferred if the presence of the user in proximity to the device is not detected.

FIG. 1 shows an electronic device 100, according to an embodiment of the disclosure. The electronic device 100 includes an illuminable indicator 102, a presence detector 104, and a controller 106. The illuminable indicator 102 and the presence detector 104 are hardware, whereas the controller 106 may be software, hardware, or a combination of software and hardware. While just one illuminable indicator 102 and just one presence detector 104 are depicted in FIG. 1, there is typically more than one illuminable indicator 102 and there can be more than one presence detector 104.

The illuminable indicator 102 is to indicate information to a user of the electronic device 100 by being illuminated (i.e., lit), or by not being illuminated (i.e., not lit). For example, the illuminable indicator 102 may be a light-emitting diode (LED) that is illuminated to indicate that an event has occurred or a condition has resulted, and that is not illuminated to indicate that the event has not occurred, that a different event has occurred, that a condition has not resulted, or that a different condition has resulted. Where the electronic device 100 is a piece of networking equipment, for instance, a representative LED may be successively flashed between being lit and not being lit to indicate that data is currently being transferred, and may be lit solid such that it does not flash to indicate that a networking link has been established but that no data is currently being transferred.

Other examples of illuminable indicators include liquid-crystal displays (LCD's), the backlights for LCD's, organic LED's (OLED's), OLED displays, and so on. For example, an LCD is an illuminable indicator in that the pixels of the LCD are selectively illuminated to convey information to a user, such as in the case where the LCD is the display for a computing device. As another example, the backlight for an LCD is an illuminable indicator in that the backlight is illuminated so that the user is able to view the information displayed by the LCD, where the information displayed by the LCD may not be otherwise easily viewable but for the backlight being illuminated.

The illuminable indicator 102 is in comparison to a light, such as an incandescent light bulb, a fluorescent light bulb, and so on. A light provides sufficient light to illuminate the surroundings of the user. By comparison, an illuminable indicator may not provide sufficient light to illuminate the surroundings of the user. For example, an LED typically does not provide sufficient light to adequately illuminate the surroundings of the user. Furthermore, a light does not typically convey information of an electronic device of which it may be a part. By comparison, an illuminable indicator does convey information of the electronic device of which it is a part.

The presence detector 104 is to detect the presence of the user in proximity to the electronic device 100, regardless of whether the user is moving or is stationary. The sensitivity of the presence detector 104 may be adjustable to control how proximate the user has to be to the electronic device 100 for the detector 104 to detect the presence of the user. Examples of presence detectors include infrared or other heat-based detectors, camera or other image-based detectors, ultrasound or other sound-based detectors, and so on. As noted above, a presence detector is in comparison to a motion detector, insofar as the latter detects a user just when in motion, whereas the former detects a user regardless of whether the user is in motion or is stationary.

The controller 106 is to enable the illuminable indicator 102 based at least on the presence of the user as detected by the presence detector 104, and is to disable the indicator 102 based at least on the absence of the user. The absence of the user is inferred upon the presence detector 104 not detecting the presence of the user in proximity to the electronic device 100. As noted above, enablement of the illuminable indicator 102 does not mean that the indicator 102 is necessarily illuminated. Rather, the illuminable indicator 102 is illuminated if the indicator 102 is enabled and if the information the indicator 102 is to indicate to the user should result in the indicator 102 being illuminated. Likewise, disablement of the illuminable indicator 102 means that the indicator 102 is never illuminated while disabled. That is, if the illuminable indicator 102 has been disabled, the indicator 102 is never illuminated while disabled, regardless of whether the information the indicator 102 is to indicate to the user should otherwise result in the indicator 102 being illuminated.

In one embodiment, in response to the presence detector 104 detecting the presence of the user in proximity to the electronic device 100, the controller 106 is further to start a timer in addition to enabling the illuminable indicator 102. When the timer reaches a predetermined value, the controller 106 then disables the illuminable indicator 102 if the presence detector 104 is no longer detecting the presence of the user in proximity to the electronic device 100. One purpose of the timer is to keep the illuminable indicator 102 in an enabled state so that it may be illuminated, even when the user is momentarily not detected, so that the indicator 102 is not disabled for a brief period of time and then re-enabled if the user is soon again detected. The timer may be a countdown timer that counts down to zero, or may count up to a predetermined value.

In one embodiment, the electronic device 100 has a power-saving mode that can be set by the user. If the power-saving mode has not been set, the controller 106 enables the illuminable indicator 102, regardless of whether the presence of the user has been detected or not. If the power-saving made has been set, then the controller 106 enables and disables the illuminable indicator 102 based on the presence or absence of the user in proximity to the electronic device 100, as detected or not detected by the presence detector 104. A timer may further be employed, too, to permit the illuminable indicator 102 to remain enabled for a period of time after the presence detector 104 no longer detects the presence of the user, as noted above.

Figure 2:
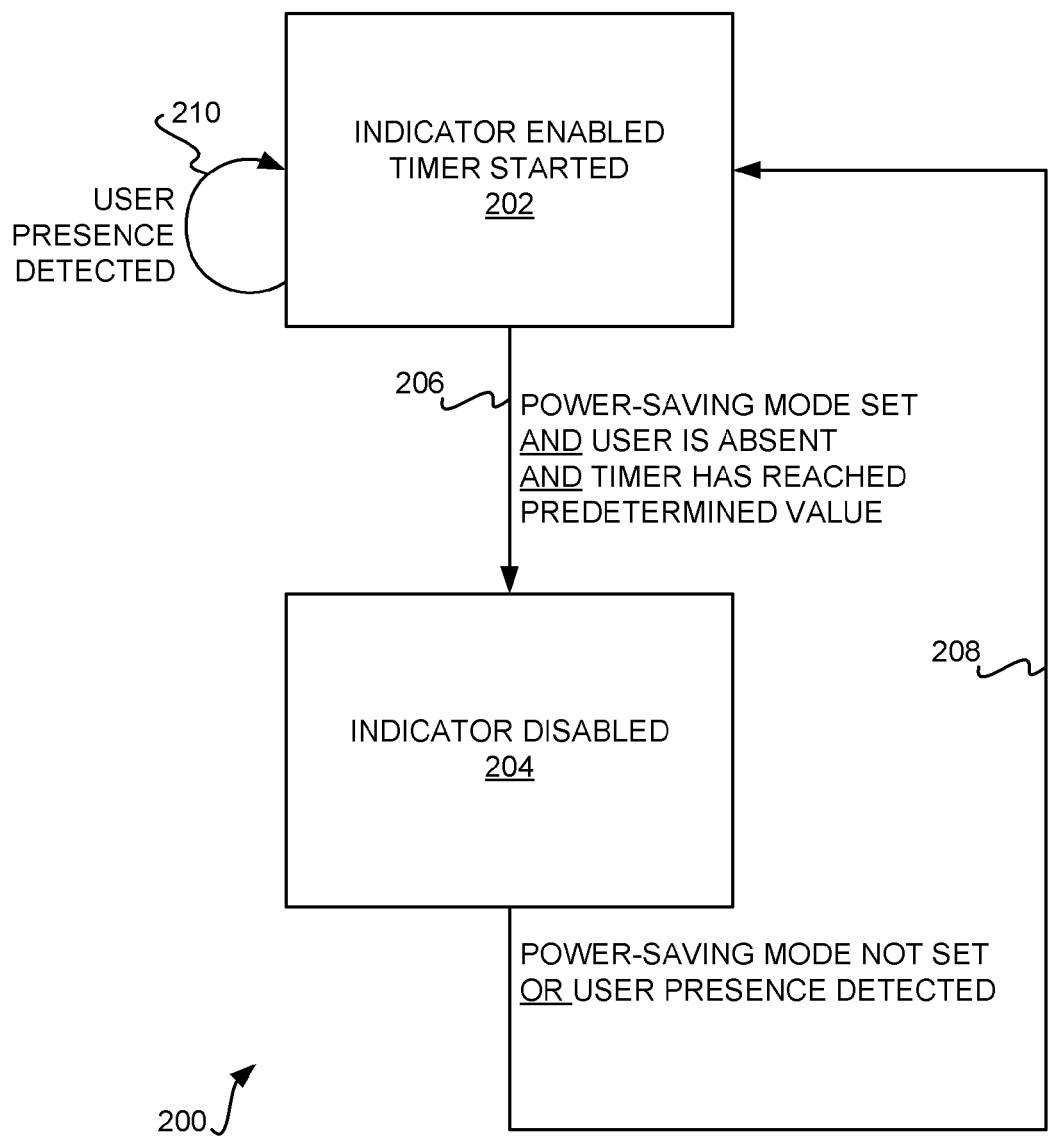
FIG. 2 is a diagram of a state machine that a controller of the electronic device of FIG. 1 can implement to control enablement and disablement of the illuminable indicator of the device, according to an embodiment of the disclosure.

FIG. 2 shows a state machine 200 that the controller 106 can implement, according to an embodiment of the disclosure. The state machine 200 includes states 202 and 204, where the state 202 is the initial state of the state machine 200. The state machine 200 further includes three edges 206, 208, and 210 that control how the states 202 and 204 are traversed. The edges 206, 208, and 210 are directional.

In the state 202, the illuminable indicator 102 is enabled, and a timer is started upon entry into the state 202. As noted above, just because the illuminable indicator 102 is enabled does not necessarily mean that the indicator 102 is illuminated. Rather, the illuminable indicator 102 is illuminated in the state 202 of the state machine 200 if the information that the indicator 102 is to convey to the user should result in the indicator 102 being illuminated. In the state 204, the illuminable indicator 104 is disabled. The illuminable indicator 102 is never illuminated in the state 202 of the state machine 200, regardless of whether the information that the indicator 102 is to convey to the user should otherwise result in the indicator 102 being illuminated.

The edge 206 directly leads from the state 202 to the state 204. The edge 206 corresponds to the power-saving mode having been set, the absence of the user having been inferred as a result of the presence of the user not having been detected by the presence detector 104, and the timer having reached a predetermined value, in a logical AND manner. The logical AND manner means that all three of these conditions have to occur for the state machine 200 to transition from the state 202 to the state 204 along the edge 206.

The edge 208 directly leads from the state 204 to the state 202. The edge 208 corresponds to the power-saving mode not having been set, or the presence of the user having been detected by the presence detector 104, in a logical OR manner. The logical OR manner means that either or both of these conditions have to occur for the state machine 200 to transition from the state 204 to the state 202 along the edge 208.

The edge 210 leads from the state 202 to itself. The edge 210 corresponds to the presence of the user having been detected by the presence detector 104. The inclusion of the edge 210 effectively means that the timer is constantly restarted while the presence detector 104 detects the presence of the user in proximity to the electronic device 100. The timer thus cannot reach its predetermined value until after the presence detector 104 no longer detects the presence of the user for a period of time defined by the timer.

Figure 3:
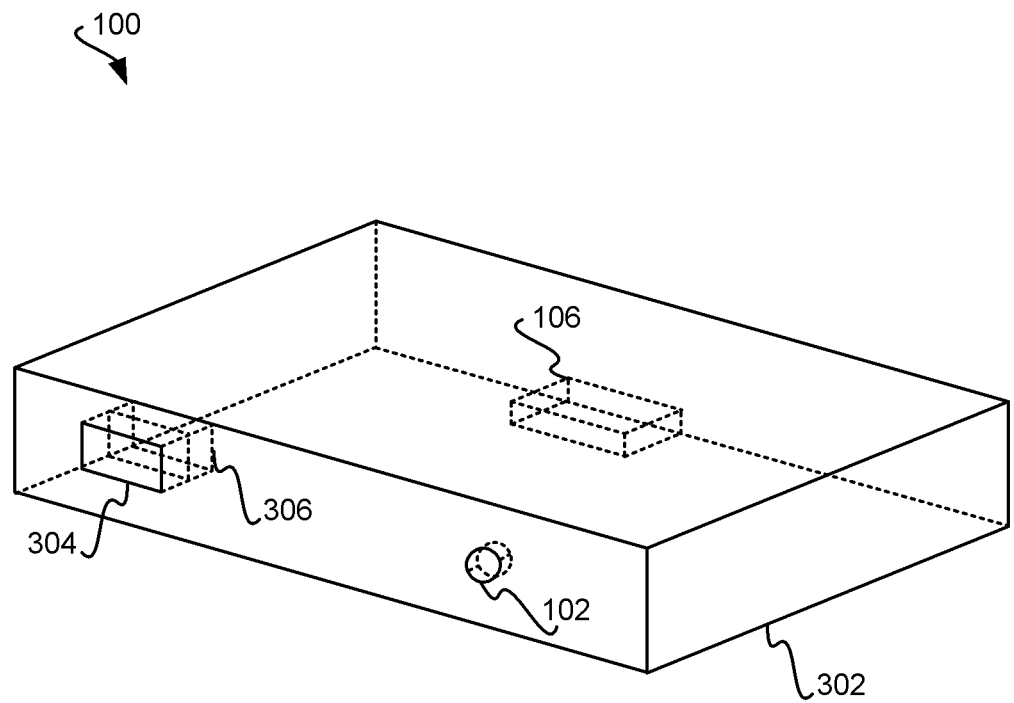
FIG. 3 is a diagram of a perspective view of the electronic device of FIG. 1, according to an embodiment of the present disclosure.

FIG. 3 shows a perspective view of the electronic device 100, according to an embodiment of the disclosure. The electronic device 100 includes a housing 302. The illuminable indicator 102 and the presence detector 104 are disposed within the housing 302 such that they are at least partially visible from outside (i.e., external to) the housing. The illuminable indicator 102 is at least partially visible in this manner so that a user can view the indicator 102, whereas the presence detector 104 is at least partially visible in this manner so that it can detect the presence of the user in proximity to the electronic device 100. By comparison, the controller 106 is disposed completely within the housing 302. Electrical connections between the controller 106 and the illuminable indicator 102 and the presence detector 104 are not depicted in FIG. 3 for illustrative convenience and for illustrative clarity.

The electronic device 100 can include a translucent badge 304 disposed at an exterior surface of the housing 302. The translucent badge may have a logo of the manufacturer of the electronic device 100. For example, the logo may read "ACME" in a stylized form, where the word "ACME" corresponds to the manufacturer of the device 100. The presence detector 104 is at least partially positioned within the housing 302 directly behind the translucent badge 304. The badge 304 is translucent so that the presence detector 104 is able to detect the user in proximity to the electronic device 100, through the badge 304. If the badge 304 were opaque, for instance, the presence detector 104 may not be operable to detect the user in proximity to the electronic device 100.

The electronic device 100 of the embodiment of FIG. 3 is advantageous, because it permits the presence detector 104 to be included in a conventional device having the illuminable indicator 102 and the housing 302 without requiring additional holes to be formed within the housing 302, and without rendering the presence detector 104 otherwise as noticeable. A conventional electronic device that includes an illuminable indicator and the badge thus just has have its badge replaced with a translucent one (if the badge is not already translucent) and add a presence detector behind the badge to result in the electronic device 100 of FIG. 3. Furthermore, users are unlikely to notice the inclusion of the presence detector in such a device, since it is relatively concealed behind the badge.

In conclusion, FIG. 4 shows a method 400 depicting how the electronic device 100 operates, according to an embodiment of the disclosure. While not explicitly described herein, the method 400 is amenable to implementation pursuant to the state diagram 200 that has been described. The presence detector 104 detects the presence of the user in proximity to the electronic device 100 (402), regardless of whether the user is moving or is stationary. In response, the illuminable indicator 102 is enabled to permit the indicator 102 to be illuminated and not illuminated, as appropriate, to indicate information to the user (404). As such, the method 400 illuminates and ceases illumination of the illuminable indicator 102 in correspondence with the information to be indicated to the user (406).

At some point, the absence of the user in proximity to the electronic device 100 may be inferred (408), from the presence detector 104 not detecting the presence of the user in proximity to the device 100. In response, the illuminable indicator 102 is disabled so that the indicator 102 cannot be illuminated to indicate information to the user (410). As has been described above, enablement of the illuminable indicator 102 in part 404 does not mean that the indicator 102 is necessarily illuminated. Rather, the illuminable indicator 102 is illuminated in part 406 in correspondence with the information that the indicator 102 is to indicate to the user. By comparison, disablement of the illuminable indicator 102 means that the indicator 102 is never illuminated, even if the information that the indicator 102 is to indicate to the user otherwise would result in the indicator 102 being illuminated.

I claim:

1. An electronic device comprising:
   an illuminable indicator to indicate information to a user of the electronic device by one or more of being illuminated and not being illuminated;
   a presence detector to detect presence of the user in proximity to the electronic device regardless of whether the user is moving or is stationary, where absence of the user is to be inferred upon the presence detector not detecting the presence of the user;
   a controller to enable the illuminable indicator based at least on the presence of the user as detected by the presence detector and to disable the illuminable indictor based at least on the absence of the user,
   wherein enablement of the illuminable indicator does not mean that the illuminable indicator is necessarily illuminated,
   and wherein disablement of the illuminable indicator means that the illuminable indicator is never illuminated while disabled, regardless of whether the information should otherwise result in the illuminable indicator being illuminated.

2. The electronic device of claim 1, wherein where the illuminable indicator has been enabled, the illuminable indicator is to be illuminated and not be illuminated in correspondence with the information.

3. The electronic device of claim 1, wherein the illuminable indicator provides insufficient light to illuminate surroundings of the user.

4. The electronic device of claim 1, further comprising a housing, the illuminable indicator and the presence detector disposed within the housing such that the illuminable indicator and the presence detector are at least partially visible from external to the housing, the controller being internally disposed within the housing.

5. The electronic device of claim 4, further comprising a translucent badge disposed at an exterior surface of the housing, the translucent badge having a logo of the manufacturer of the electronic device, the presence detector at least partially positioned within the housing behind the translucent badge.

6. The electronic device of claim 1, wherein in response to the presence detector detecting the presence of the user, the controller is to enable the illuminable indicator and start a timer, and in response to the timer reaching a predetermined value, the controller is to disable the illuminable indicator where the presence detector no longer detects the presence of the user.

7. The electronic device of claim 1, wherein the electronic device has a power-Saving mode settable by the user, where the controller is to enable the illuminable indicator responsive to the power-saving mode not having been set regardless of the presence of the user, and where the controller is to enable the illuminable indicator responsive to the power-saving mode having been set upon the presence detector detecting the presence of the user.

8. The electronic device of claim 1, wherein the controller is to implement a state machine comprising:
   a first state in which the illuminable indicator is enabled and a timer is started;
   a second state in which the illuminable indicator is disabled;
   a first edge leading directly from the first state to the second state, and corresponding to at least the timer reaching a predetermined value and the absence of the user in a logical AND manner; and, a second edge leading directly from the second state to the first state, and corresponding to at least the presence of the user being detected by the presence detector.

9. The electronic device of claim 8, wherein the state machine further comprises a third edge leading directly from the first state back to the first state, and corresponding to the presence of the user being detected by the presence detector.

10. The electronic device of claim 8, wherein the first edge of the state machine corresponds to the timer reaching the predetermined value, to the absence of the user, and to a power-saving mode having been set, in the logical AND manner, and wherein the second edge of the state machine corresponds to the presence of the user being detected by the presence detector, or to the power-saving mode not having been set, in a logical OR manner.

11. A method comprising:
in response at least to a presence of a user in proximity to an electronic device being detected by a presence detector of the electronic device, and regardless of whether the user is moving or is stationary,
enabling an illuminable indicator of the electronic device to permit the illuminable indicator to be one or more of illuminated and not illuminated to indicate information to the user of the electronic device,
where absence of the user is inferred where the presence of the user is not detected by the presence detector;
in response at least to the absence of the user in proximity to the electronic device being inferred,
disabling the illuminable indicator of the electronic device, wherein enablement of the illuminable indicator does not mean that the illuminable indicator is necessarily illuminated,
and wherein disablement of the illuminable indicator means that the illuminable indicator is never illuminated while disabled, regardless of whether the information should otherwise result in the illuminable indicator being illuminated.

12. The method of claim 11, further comprising, where the illuminable indicator has been enabled, illuminating and ceasing illumination of the illuminable indicator in correspondence with the information.

13. The method of claim 11, further comprising, in response at least to the presence of the user in proximity to the electronic device being detected, starting a timer,
wherein disabling the illuminable indicator is responsive at least to the absence of the user in proximity to the electronic device being inferred, and to the timer having reached a predetermined value, in a logical AND manner.

14. The method of claim 13, wherein enabling the illuminable indicator is responsive to the presence of the user in proximity to the electronic device being detected, or to a power-saving mode of the electronic device not having been set, in a logical OR manner,
and wherein disabling the illuminable indicator is responsive to the absence of the user in proximity to the electronic device being inferred, to the timer having reached the predetermined value, and to the power-saving mode of the electronic device having been set, in a logical AND manner.

15. An electronic device comprising:
illuminating means for indicating information to a user of the electronic device by one or more of being illuminated and not being illuminated;
detecting means for detecting presence of the user in proximity to the electronic device regardless of whether the user is moving or is stationary, where absence of the user is to be inferred upon the detecting means not detecting the presence of the user;
controlling means for enabling the illuminating means based at least on the presence of the user as detected by the detecting means and for disabling the illuminating means based at least on the absence of the user,
wherein enablement of the illuminating means does not mean that the illuminating means is necessarily illuminated,
and wherein disablement of the illuminating means does mean that the illuminating means is never illuminated while disabled, regardless of whether the information should otherwise result in the illuminable indicator being illuminated.

* * * * *

UNITED STATES PATENT AND TRADEMARK OFFICE
CERTIFICATE OF CORRECTION

| | |
|---|---|
| PATENT NO. | : 8,692,683 B2 |
| APPLICATION NO. | : 13/258548 |
| DATED | : April 8, 2014 |
| INVENTOR(S) | : Daniel J. Dove |

It is certified that error appears in the above-identified patent and that said Letters Patent is hereby corrected as shown below:

In the Claims

In column 6, line 13, in Claim 1, delete "indictor" and insert -- indicator --, therefor.

In column 6, line 51, in Claim 7, delete "power-Saving" and insert -- power-saving --, therefor.

Signed and Sealed this
Twenty-ninth Day of July, 2014

Michelle K. Lee
*Deputy Director of the United States Patent and Trademark Office*